United States Patent
Hirano

(10) Patent No.: US 9,904,496 B2
(45) Date of Patent: Feb. 27, 2018

(54) INSTALLATION SYSTEM, INFORMATION PROCESSING APPARATUS, AND INSTALLATION METHOD

(71) Applicant: Yuuki Hirano, Kanagawa (JP)

(72) Inventor: Yuuki Hirano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/246,628

(22) Filed: Aug. 25, 2016

(65) Prior Publication Data
US 2017/0060498 A1 Mar. 2, 2017

(30) Foreign Application Priority Data
Aug. 26, 2015 (JP) .................................. 2015-167124

(51) Int. Cl.
G06F 3/12 (2006.01)

(52) U.S. Cl.
CPC .......... *G06F 3/1225* (2013.01); *G06F 3/1204* (2013.01); *G06F 3/1288* (2013.01)

(58) Field of Classification Search
USPC ................................................. 358/1.1–3.29
See application file for complete search history.

(56) References Cited

U.S. PATENT DOCUMENTS

| | | | |
|---|---|---|---|
| 7,689,673 B2 | 3/2010 | Kemp et al. | |
| 8,443,060 B2 | 5/2013 | Kemp et al. | |
| 2009/0109481 A1* | 4/2009 | Ozaki | G06F 3/1204 358/1.15 |
| 2010/0097650 A1* | 4/2010 | Seo | G06F 3/1204 358/1.15 |
| 2010/0296122 A1* | 11/2010 | Mitsui | G06F 3/1204 358/1.15 |
| 2011/0286034 A1 | 11/2011 | Hirano | |
| 2013/0176584 A1* | 7/2013 | Takashima | G06F 3/1204 358/1.13 |
| 2013/0246777 A1 | 9/2013 | Fukasawa | |

FOREIGN PATENT DOCUMENTS

| | | |
|---|---|---|
| JP | 2004-005607 | 1/2004 |
| JP | 2013-190897 | 9/2013 |

* cited by examiner

*Primary Examiner* — Marcellus Augustin
(74) *Attorney, Agent, or Firm* — Cooper & Dunham LLP

(57) ABSTRACT

An installation system includes: a first storage unit configured to store therein driver information on printer drivers having been installed on an information processing apparatus; an acquisition unit configured to acquire shared information indicating a printer driver of a shared printer, having been reflected from a server, from the driver information; a specification unit configured to specify a printer driver not having been installed on the information processing apparatus, from the shared information acquired by the acquisition unit; and a first execution unit configured to install at least one of the printer drivers specified by the specification unit by acquiring the printer driver from the server.

8 Claims, 10 Drawing Sheets

INSTALLATION SYSTEM, INFORMATION PROCESSING APPARATUS, AND INSTALLATION METHOD

CROSS-REFERENCE TO RELATED APPLICATIONS

The present application claims priority under 35 U.S.C. § 119 to Japanese Patent Application No. 2015-167124, filed Aug. 26, 2015. The contents of which are incorporated herein by reference in their entirety.

BACKGROUND OF THE INVENTION

1. Field of the Invention

The present invention relates to an installation system, an information processing apparatus, and an installation method.

2. Description of the Related Art

Point and Print is a known technology in which a printer driver installed on a server is shared in server and client environments in Windows (registered trademark), the printer driver of a shared printer is installed on a client via a network, and printing is performed by the shared printer connected to the server.

As the Point and Print technology, the following technology has been developed (see Japanese Unexamined Patent Application Publication No. 2004-005607). In response to a control point terminal performing an operation of adding a new printer in a printer folder in a client workstation, the control point terminal transmits identification information of a new printer to be added, to an agent of the client workstation. In the client workstation, the agent receives the identification information from the control point terminal. In response to receiving the identification information of the new printer, the agent automatically acquires printer configuration information and print driver information based at least in part on the received identification information. The agent automatically configures the printer based on the acquired printer configuration information and print driver information, and installs a print driver.

However, the technology disclosed in Japanese Unexamined Patent Application Publication No. 2004-005607 has a problem in that when a new printer is shared on the server in a Point and Print environment, the client cannot identify the new printer, and cannot immediately install the printer driver of the new printer.

SUMMARY OF THE INVENTION

According to an aspect of the present invention, there is provided an installation system, including: a first storage unit configured to store therein driver information on printer drivers having been installed on an information processing apparatus; an acquisition unit configured to acquire shared information indicating a printer driver of a shared printer, having been reflected from a server, from the driver information; a specification unit configured to specify a printer driver not having been installed on the information processing apparatus, from the shared information acquired by the acquisition unit; and a first execution unit configured to install at least one of the printer drivers specified by the specification unit by acquiring the printer driver from the server.

According to another aspect of the present invention, there is provided an information processing apparatus, including: a first storage unit configured to store therein driver information on printer drivers having been installed; an acquisition unit configured to acquire shared information indicating a printer driver of a shared printer, having been reflected from the server, from the driver information; a specification unit configured to specify a printer driver not having been installed, from the shared information acquired by the acquisition unit; and a first execution unit configured to install at least one of the printer drivers specified by the specification unit by acquiring the printer driver from the server.

According to still another aspect of the present invention, there is provided an installation method, including: acquiring shared information indicating a printer driver of a shared printer, having been reflected from a server, from driver information on printer drivers having been installed on an information processing apparatus, the driver information being stored in a storage unit; specifying a printer driver not having been installed on the information processing apparatus, from the shared information having been acquired; and installing at least one of the printer drivers having been specified by acquiring the printer driver from the server.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
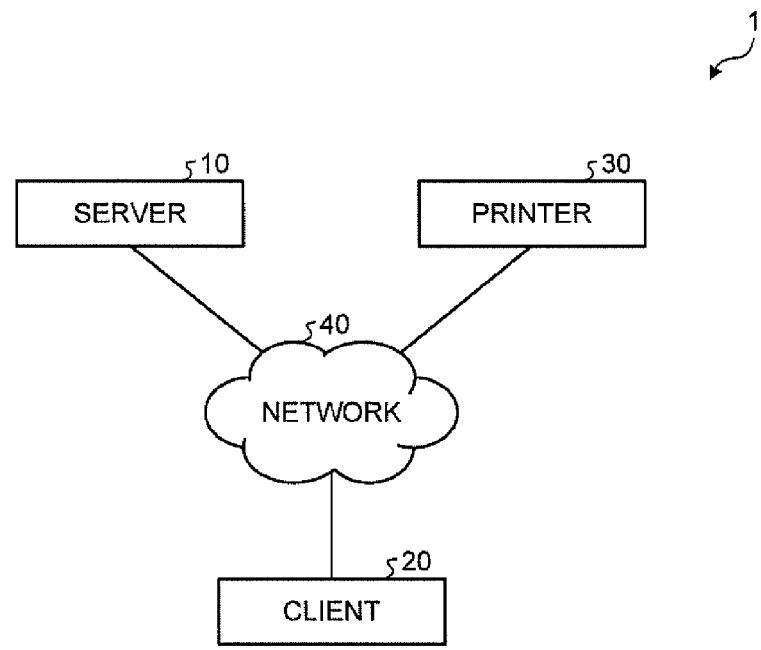
FIG. 1 is a diagram illustrating an example of an overall structure of an installation system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide an installation system, an information processing apparatus, and an installation method that, when a new printer is shared on the server, the client can identify the new printer and install the printer driver of the new printer.

Embodiments of an installation system, an information processing apparatus, an installation method, and a computer program according to the present invention will now be described in detail with reference to FIG. 1 to FIG. 12. It is understood that the present invention is not limited to the following embodiments. Elements in the following embodiments include elements that can be easily assumed by a person skilled in the art, elements that are substantially the same, and elements that fall within what is called a range of equivalents. Furthermore, various omissions, substitutions, changes, and combinations of the elements may be made without departing from the spirit of the following embodiments.

First Embodiment

Overall Structure of an Installation System

FIG. 1 is a diagram illustrating an example of an overall structure of an installation system according to a first embodiment. An outline of the overall structure of an installation system 1 will now be described with reference to FIG. 1.

As illustrated in FIG. 1, the installation system 1 includes a server 10, a client 20, and a printer 30 (shared printer). The installation system 1 is a system in what is called a Point and Print environment. The server 10, the client 20, and the printer 30 are communicable with one another via a network 40. In FIG. 1, the installation system 1 includes a single client (client 20). However, it is not limited thereto, and the installation system 1 may include a plurality of clients.

The server 10 is a server device that functions as a print server capable of directly controlling the printing operation of the printer 30. More specifically, upon receiving a print request from the client 20 and spooling print data, the server 10 causes the printer 30, which is controlled by the server 10, to sequentially print the print data. In the structural example illustrated in FIG. 1, the printer 30 is communicably connected to the server 10 via the network 40. However, it is not limited thereto. In other words, the printer 30 may be connected directly (local connection) to the server 10. In this context, for example, the port to which the printer 30 is connected is in compliance with the standards of a parallel port, a universal serial bus (USB) port, an Institute of Electrical and Electronics Engineers (IEEE) 1394 port, and the like.

The client 20 is an information processing apparatus that is a general computer such as a personal computer (PC). The client 20 transmits print data to be printed to the printer 30 via the server 10, and causes the printer 30 to print the print data. The client 20 also receives a printer driver from the server 10 via the network 40, and installs the printer driver therein.

The printer 30 is an image forming device that receives the print data having been converted into a page description language (PDL) from the server 10, and prints out the print data. The printer 30 may be any image forming device having a printing function. For example, the printer 30 may be a multifunction peripheral (MFP) that includes at least two functions of a copy function, a printer function, a scanner function, and a facsimile function.

For example, the network 40 is a network such as a local area network (LAN), a wide area network (WAN), or the Internet. For example, the network 40 performs data communication using Transmission Control Protocol (TCP)/Internet Protocol (IP), or the like.

Hardware Structure of the Server and the Client

Figure 2:
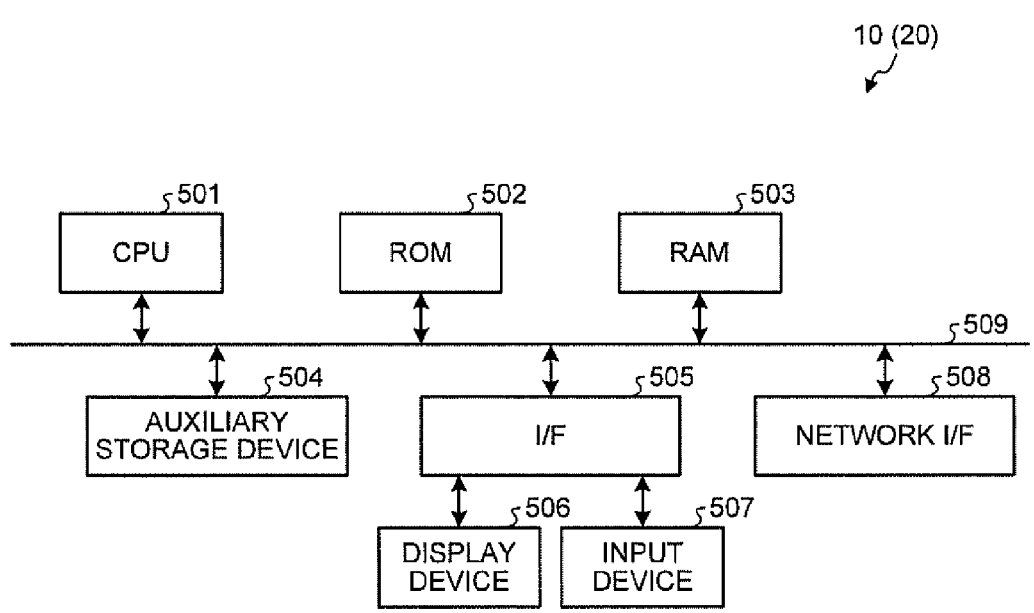
FIG. 2 is a diagram illustrating an example of a hardware structure of a server and a client.

FIG. 2 is a diagram illustrating an example of a hardware structure of the server and the client. The hardware structure of the server 10 and the client 20 will now be described with reference to FIG. 2.

First, the hardware structure of the server 10 will be described with reference to FIG. 2. As illustrated in FIG. 2, the server 10 includes a central processing unit (CPU) 501, a read-only memory (ROM) 502, a random-access memory (RAM) 503, an auxiliary storage device 504, an interface (I/F) 505, a display device 506, an input device 507, and a network I/F 508.

The CPU 501 is a device that controls the overall operation of the server 10. The ROM 502 is a non-volatile storage device that stores therein computer programs such as firmware for the server 10. The RAM 503 is a non-volatile storage device used as a work area of the CPU 501.

The auxiliary storage device 504 is a storage device such as a hard disk drive (HDD) or a solid state drive (SSD) that stores therein an operating system (OS), application programs, and various types of data. The I/F 505 is an interface for connecting various devices (such as the display device 506 and the input device 507) to a bus 509.

The display device 506 is a display device such as a liquid crystal display (LCD), a plasma display, or an electro-luminescence (EL) display that displays various types of information such as a cursor, menus, windows, characters, or images. The input device 507 is an input device such as a mouse or a keyboard used to input characters and numerals, select various instructions, move the cursor, and the like.

The network I/F 508 is an interface for communicating data via the network 40.

The CPU 501, the ROM 502, the RAN 503, the auxiliary storage device 504, the I/F 505, and the network I/F 508 described above are communicably connected with one another via the bus 509 such as an address bus and a data bus.

The computer program for the server 10 described above may also be stored and distributed in a computer-readable recording medium such as a compact disc-read only memory (CD-ROM), a compact disc-recordable (CD-R), a digital versatile disc (DVD), or a Blu-ray disc in a file of an installable format or an executable format.

Because the client 20 has the same hardware structure as that of the server 10 described above, the description thereof will be omitted. However, the ROM 502 and the auxiliary storage device 504 in the client 20 store therein various computer programs for the client 20, to control the client 20. In this case also, the computer programs for the client 20 may be stored and distributed in a computer-readable recording medium such as a CD-ROM, a CD-R, a DVD, or a Blu-ray disc in a file of an installable format or an executable format.

An Operational Overview of Point and Print

Figure 3:
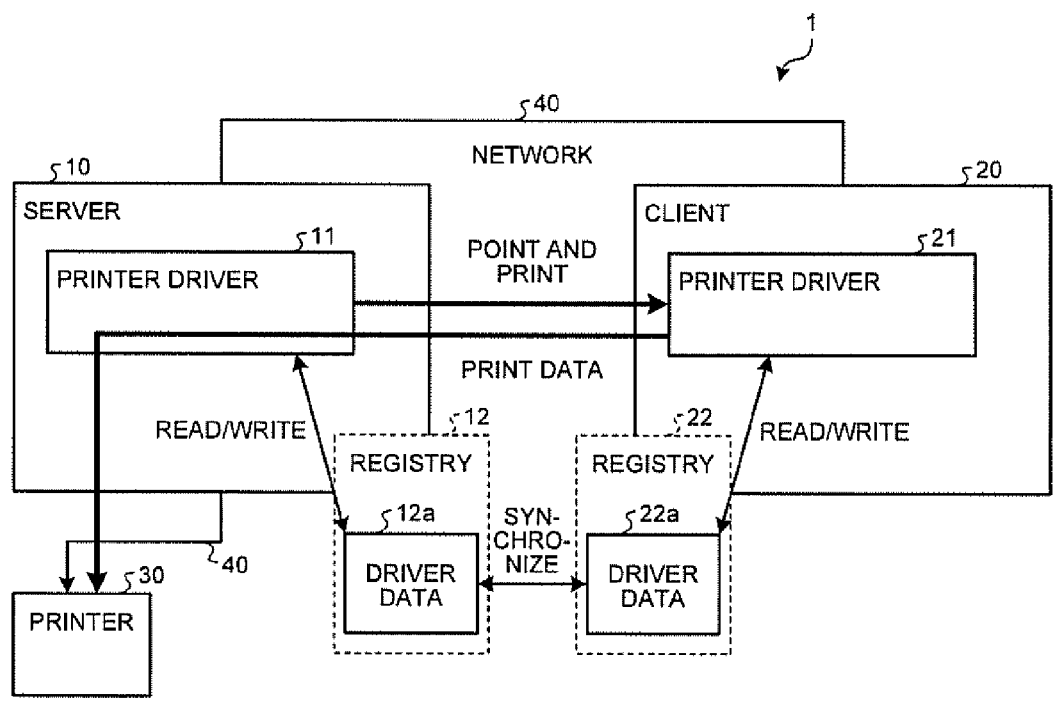
FIG. 3 is a diagram for explaining an operation in Point and Print.
Figure 4:
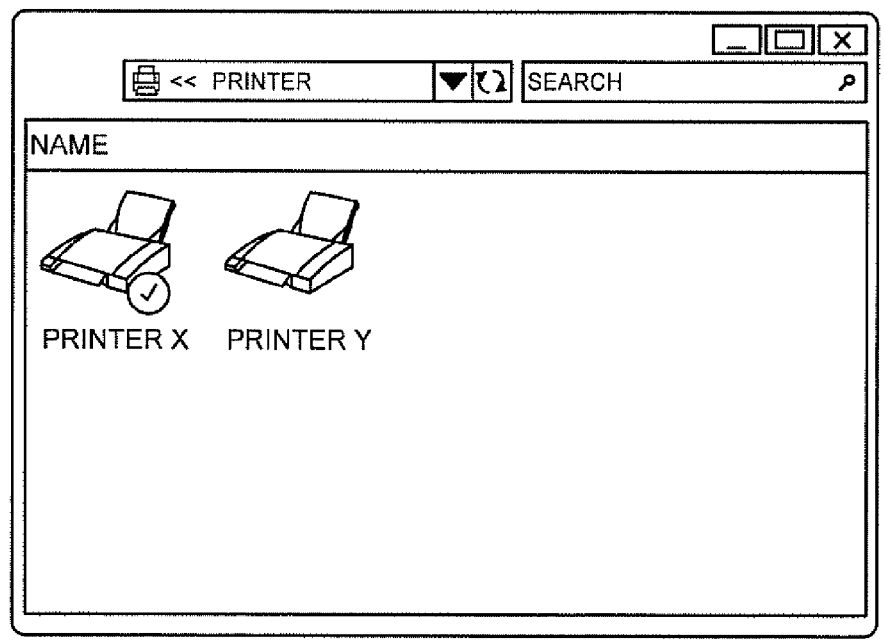
FIG. 4 is a diagram illustrating an example of a printer screen.

FIG. 3 is a diagram for explaining an operation in Point and Print. FIG. 4 is a diagram illustrating an example of a printer screen. The operational overview of Point and Print in the installation system 1 will now be described with reference to FIG. 3 and FIG. 4.

It is assumed that a new printer driver 11 is installed on the server 10 in the installation system 1. On the printer screen as illustrated in FIG. 4, the share setting is turned ON on the property screen of an icon (printer icon) of a printer to be controlled by the installed printer driver 11. It is also assumed that a "shared printer name" has been set as the shared printer.

Next, in the client 20, a print settings screen is opened or printing operation is executed, for example. If the printer having been controlled by the specified printer driver is set to be shared, a list of printer drivers excluding the printer driver of the shared printer, as well as the printer drivers of the shared printers that are not installed (not-yet-installed) on the client 20 will be displayed. The user then selects a printer driver the user wishes to install, from the displayed not-yet-installed printer drivers. For example, it is assumed that the printer driver the user wishes to install and has selected is a printer driver 21 corresponding to the printer driver 11 illustrated in FIG. 3. The client then acquires the selected printer driver 21 from the server, and installs the selected printer driver 21 therein. The icon indicating the shared printer controlled by the installed printer driver 21 will be displayed on the printer screen of the client.

Consequently, when the client transmits print data to be printed to the server 10, it is possible to cause the shared printer (printer 30 in FIG. 4) having been controlled by the installed printer driver 21 to print out the print data. The print settings of the printer driver 11 installed on the server 10, as well as information on the settings, attributes, and the like on the printer driver 11 (hereinafter, referred to as driver data) (driver information), are written in a registry 12 of the server 10. In this process, the content of the driver data (driver data 12a) of the printer driver 11 that is stored in the registry 12 of the server 10, and the content of the driver data (driver data 22a) of the printer driver 21 that is stored in a registry 22 of the client 20 will be synchronized via the network 40. In other words, when the content of the driver data 12a on the server 10 side is modified, the modified content is reflected on the driver data 22a on the client 20 side. For example, a reflection unit 106 illustrated in FIG. 5, which will be described below, may synchronize the driver data 12a with the driver data 22a.

Functional Block Structure of the Server and the Client

Figure 5:
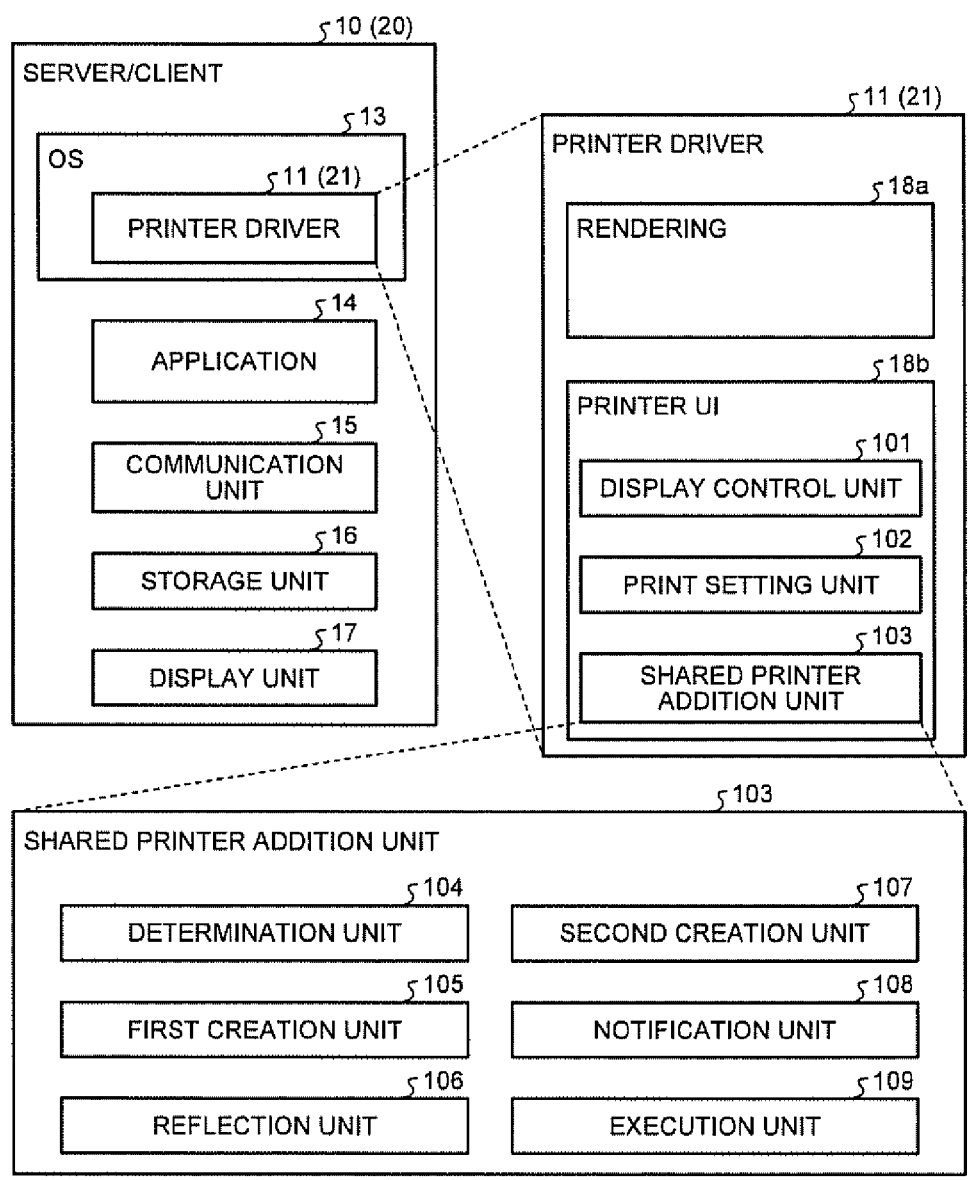
FIG. 5 is a diagram illustrating an example of a functional block structure of a server and a client according to the first embodiment.

FIG. 5 is a diagram illustrating an example of a functional block structure of the server and the client according to the first embodiment. The structure and operation of the functional blocks of the server 10 and the client 20 of the installation system 1 will now be described with reference to FIG. 5.

As illustrated in FIG. 5, the server 10 and the client 20 are each installed with an OS 13 and an application 14. Also, the server 10 and the client 20 each include a communication unit 15, a storage unit 16, and a display unit 17.

For example, the OS 13 is basic software such as Windows, and controls the execution of computer programs such as the application 14. The OS 13 includes the printer driver 11 (printer driver 21). The printer driver 11 is installed on the server 10, and the printer driver 21 is installed on the client 20. The printer driver 11 (printer driver 21) is software that controls the operation of the printer 30 connected to the network 40. If the printer 30 supports a plurality of PDLs, a plurality of printer drivers 11 (printer driver 21) may be installed. The printer driver 11 (printer driver 21) may also control a plurality of printers 30. The printer driver 11 (printer driver 21) includes a rendering 18a and a printer user interface (UI) 18b.

The rendering 18a converts the print data delivered from applications (not limited to the application 14) of the server 10 (client 20) to a specific PDL. A display control unit 101, a print setting unit 102, and a shared printer addition unit 103 are implemented, when the printer UI 18b is executed by the CPU 501 illustrated in FIG. 2.

The application 14 is a computer program that generates print data, and instructs the printer 30 to execute printing.

The communication unit 15 is a functional unit used to communicate data between the client 20 (server 10) and the printer 30. The communication unit 15 is implemented using the network I/F 508 illustrated in FIG. 2.

The storage unit 16 is a functional unit that stores therein various types of data such as the OS 13, which is software, the application 14, and print data. The storage unit 16 is implemented using the auxiliary storage device 504 illustrated in FIG. 2.

The display unit 17 is a functional unit that displays a graphical user interface (GUI) and the like, when the OS 13, the application 14, or the like is executed. The display unit 17 is implemented using the display device 506 illustrated in FIG. 2.

The display control unit 101 is a functional unit that causes the display unit 17 to display information required to operate the printer driver 11 (printer driver 21), a screen used for print settings, or the like.

The print setting unit 102 is a functional unit that sets new print settings or makes changes in the print settings, via the screen for print settings having been displayed on the display unit 17 by the display control unit 101.

The shared printer addition unit 103 is a functional unit that installs (Point and Print) a not-yet-installed printer driver on the client 20 side, among the shared printer list data created on the server 10 side. The shared printer addition unit 103 includes a determination unit 104, a first creation unit 105 (creation unit), the reflection unit 106, a second creation unit 107 (acquisition unit and specification unit), a notification unit 108, and an execution unit 109 (first execution unit).

The determination unit 104 is a functional unit that determines the operating environment of the currently running printer driver, among the environments of the stand-alone environment, and the server environment and the client environment in the Point and Print environment.

The first creation unit 105 is a functional unit that creates shared printer list data (shared information), when the determination unit 104 determines that the operating environment is the server environment (the printer driver including the determination unit 104 is included in the server 10). The shared printer list data is a list of printer icons set to be shared (printer icons of the shared printers), among the printer icons having been associated with the printer driver installed on the server 10. The shared printer list data includes information on "server address", "shared printer name", "printer icon name", "printer driver name", and "shared printer addition function version", among the driver data (hereinafter, simply referred to as "driver data of the printer icon") associated with the respective printer icons.

The reflection unit 106 is a functional unit that stores the shared printer list data created by the first creation unit 105 in the registry 12, when the determination unit 104 determines that the operating environment is the server environment. The reflection unit 106 then reflects the shared printer list data on the driver data having been associated with the printer icon, which is set to be shared.

The second creation unit 107 is a functional unit that acquires the shared printer list data (shared information) from the driver data of the printer icon, which is specifically set to be shared, when the determination unit 104 determines that the operating environment is the client environment (printer driver including the determination unit 104 is included in the client 20). The second creation unit 107 then creates data including a printer driver list of not-yet-installed shared printers (hereinafter, referred to as not-yet-installed list data) not having been installed on the client 20, from the shared printer list data.

The notification unit 108 is a functional unit that notifies the display control unit 101 to cause the display unit 17 to display a shared printer confirmation screen illustrated in FIG. 9, which will be described below, when the determination unit 104 determines that the operating environment is the client environment. The notification unit 108 also notifies the display control unit 101 to cause the display unit 17 to display the printer driver list included in the not-yet-installed list data having been created by the second creation unit 107, on the shared printer confirmation screen. The user selects a printer driver the user wishes to install, from the printer driver list included in the not-yet-installed list data, which is notified by the notification unit 108.

The execution unit 109 is a functional unit that acquires the printer driver having been selected by the user on the shared printer confirmation screen, from the server 10 via the network 40, when the determination unit 104 determines that the operating environment is the client environment. The execution unit 109 then installs (Point and Print) the acquired printer driver.

The display control unit 101, the print setting unit 102, the shared printer addition unit 103, the determination unit 104, the first creation unit 105, the reflection unit 106, the second creation unit 107, the notification unit 108, and the execution unit 109 are conceptual functions, and the structure is not limited thereto. For example, a plurality of functional units that are illustrated as separate functional units in FIG. 5 may be configured as a single functional unit. A plurality of functions included in a single functional unit in FIG. 5 may be divided into a plurality of pieces, and may be configured as a plurality of functional units.

As described above, among the functional units illustrated in FIG. 5, if the determination unit 104 determines that the information processing apparatus including the determination unit 104 is the server 10, the first creation unit 105 and the reflection unit 106 are operated. If the determination unit 104 determines that the information processing apparatus including the determination unit 104 is the client 20, the second creation unit 107, the notification unit 108, and the execution unit 109 are operated. However, it is not limited to the structure. In other words, the server 10 and the client 20 do not necessarily include the determination unit 104. In this case, the server 10 includes the first creation unit 105 and the reflection unit 106, and does not include the second creation unit 107, the notification unit 108, or the execution unit 109. Also in this case, the client 20 includes the second creation unit 107, the notification unit 108, and the execution unit 109, and does not include the first creation unit 105 or the reflection unit 106.

About the Shared Printer List Data

Figure 6:
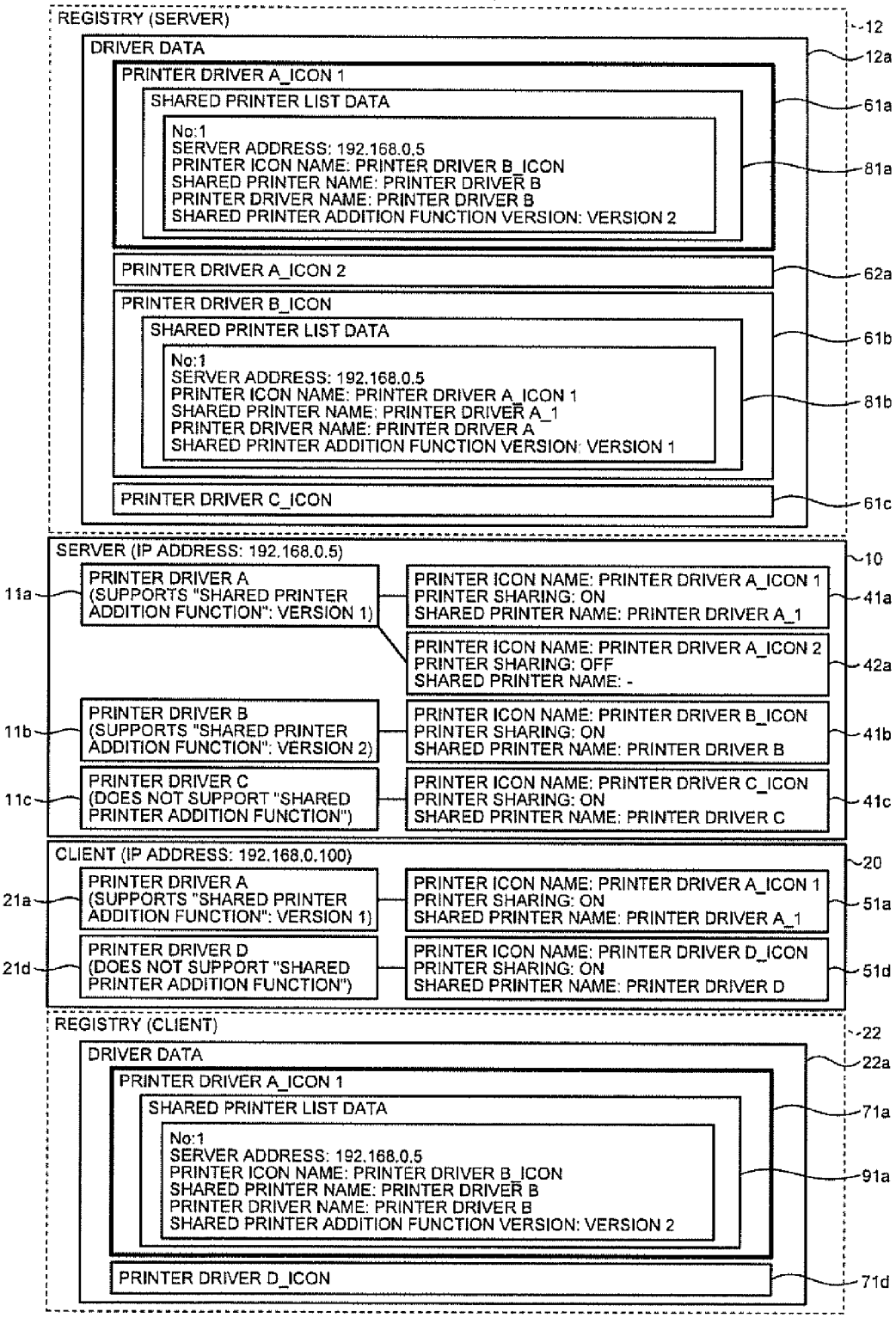
FIG. 6 is a diagram for explaining shared printer list data.

FIG. 6 is a diagram for explaining shared printer list data. The shared printer list data to be created in the server 10 will now be described with reference to FIG. 6.

For example, as illustrated in FIG. 6, three types of printer drivers 11a to 11c having printer driver names of a "printer driver A", a "printer driver B", and a "printer driver C", respectively, are installed on the server 10. Two types of printer icons 41a and 42a are associated with the printer driver 11a. The printer icons 41a and 42a are respectively associated with driver data 61a and 62a that are different information on the print settings, the attributes, and the like, on the printer driver 11a, respectively. A printer icon 41b is associated with the printer driver 11b. The printer icon 41b is associated with driver data 61b that is information on the print settings, the attributes, and the like, on the printer driver 11b. A printer icon 41c is associated with the printer driver 11c. The printer icon 41c is associated with driver data 61c that is information on the print settings, the attributes, and the like on the printer driver 11c. The driver data 12a for the printer driver installed on the server 10 is stored in the registry 12 having been loaded into the storage unit 16 (first storage unit) of the server 10. The driver data 12a includes the driver data 61a, 62a, 61b, and 61c.

In the driver data 61a of the printer icon 41a, the "printer sharing", which indicates whether the printer controlled by the printer driver 11a is set to be shared, is set to ON. The "shared printer name", which indicates the shared name, is set as the "printer driver A_1". The driver data 61a also supports the "shared printer addition function". If a printer driver supports the "shared printer addition function", the driver data is added to the shared printer list data. If a printer driver does not support the "shared printer addition function", the driver data will not be added to the shared printer list data. In the driver data 62a of the printer icon 42a, the "printer sharing", which indicates whether the printer controlled by the printer driver 11a is set to be shared, is set to OFF. In the driver data 61b of the printer icon 41b, the "printer sharing", which indicates whether the printer controlled by the printer driver 11b is set to be shared, is set to ON. The "shared printer name", which indicates the shared name, is set as the "printer driver B". The driver data 61b also supports the "shared printer addition function". In the driver data 61c of the printer icon 41c, the "printer sharing", which indicates whether the printer controlled by the printer driver 11c is set to be shared, is set to ON. The "shared printer name", which indicates the shared name, is set as the "printer driver C". However, the driver data 61c does not support the "shared printer addition function". Thus, the driver data 61c of the printer icon 41c will not be added to the shared printer list data.

For example, as illustrated in FIG. 6, two types of printer drivers 21a and 21d having printer names of a "printer driver A" and a "printer driver D", respectively, are installed on the client 20. A printer icon 51a is associated with the printer driver 21a, and driver data 71a that is information on the print settings, the attributes, and the like, on the printer driver 21a, is associated with the printer icon 51a. A printer icon 51d is associated with the printer driver 21d, and driver data 71d that is information on the print settings, the attributes, and the like on the printer driver 21d, is associated with the printer icon 51d. The driver data 22a for the printer driver installed on the client 20 is stored in the registry 22 having been loaded into the storage unit 16 (second storage unit) of the client 20. The driver data 22a includes the driver data 71a and 71d.

In the driver data 71a of the printer icon 51a, the "printer sharing", which indicates whether the printer controlled by the printer driver 21a is set to be shared, is set to ON. The "shared printer name", which indicates the shared name, is set as the "printer driver A_1". The driver data 71a also supports the "shared printer addition function". In the driver data 71*d* of the printer icon 51*d*, the "printer sharing", which indicates whether the printer controlled by the printer driver 21*d* is set to be shared, is set to ON. The "shared printer name", which indicates the shared name, is set as the "printer driver D". However, the driver data 71*d* does not support the "shared printer addition function".

For example, if the printer driver 11*a* having the printer driver name of the "printer driver A" described above is to be installed, the server 10 creates the printer icon 41*a* in which the "printer sharing" is set to ON, and the "shared printer name" is set as the "printer driver A_1". The printer icon 41*a* is to be associated with the driver data 61*a* including the above information. In this process, the server 10 creates shared printer list data that is a list of printer icons associated with the driver data in which the "printer sharing" is set to ON, and that supports the "shared printer addition function". In the example of FIG. 6, the "printer sharing" is set to ON in the driver data 61*a* of the printer icon 41*a* and the driver data 61*b* of the printer icon 41*b*, and also, the driver data 61*a* and the driver data 61*b* support the "shared printer addition function". Thus, the server 10 creates a list of printer icons that are associated with the driver data 61*a* and the driver data 61*b*, as shared printer list data. The server 10 then includes information on the "server address", the "shared printer name", the "printer icon name", the "printer driver name", and the "shared printer addition function version" among the driver data of these printer icons, in the shared printer list data. The server 10 also includes the remaining shared printer list data (shared printer list data 81*a*) excluding the information on the printer icon 41*a*, among the created shared printer list data, in the driver data 61*a* of the printer icon 41*a*. The server 10 then stores the created data in the registry 12. The server 10 also includes the remaining shared printer list data (shared printer list data 81*b*) excluding the information on the printer icon 41*b*, among the created shared printer list data, in the driver data 61*b* of the printer icon 41*b*. The server 10 then stores the created data in the registry 12.

As described above, the client 20 is installed with the printer driver 21*a* that is the same driver as the printer driver 11*a* to which the driver data 61*a* of the printer icon 41*a* of the server 10 is associated. The driver icon that is associated with the printer driver 21*a* is the printer icon 51*a*, and the driver data of the printer icon 51*a* is the driver data 71*a*. In this case, the driver data 61*a* of the printer icon 41*a* stored in the registry 12, and the driver data 71*a* of the printer icon 51*a* stored in the registry 22 are synchronized via the network 40, as illustrated in FIG. 3. In other words, the shared printer list data 81*a* written in the driver data 61*a* of the printer icon 41*a* is reflected as shared printer list data 91*a* in the driver data 71*a* of the printer icon 51*a*.

When the user opens the print settings screen or when a printing operation is executed, for example, the client 20 acquires the shared printer list data 91*a*, which is reflected from the server 10, from the driver data 71*a* of the printer driver 21*a* being installed. The client 20 then sends a notification to prompt the user to perform Point and Print.

An Operation of Creating and Storing Shared Printer List Data in the Server

Figure 7:
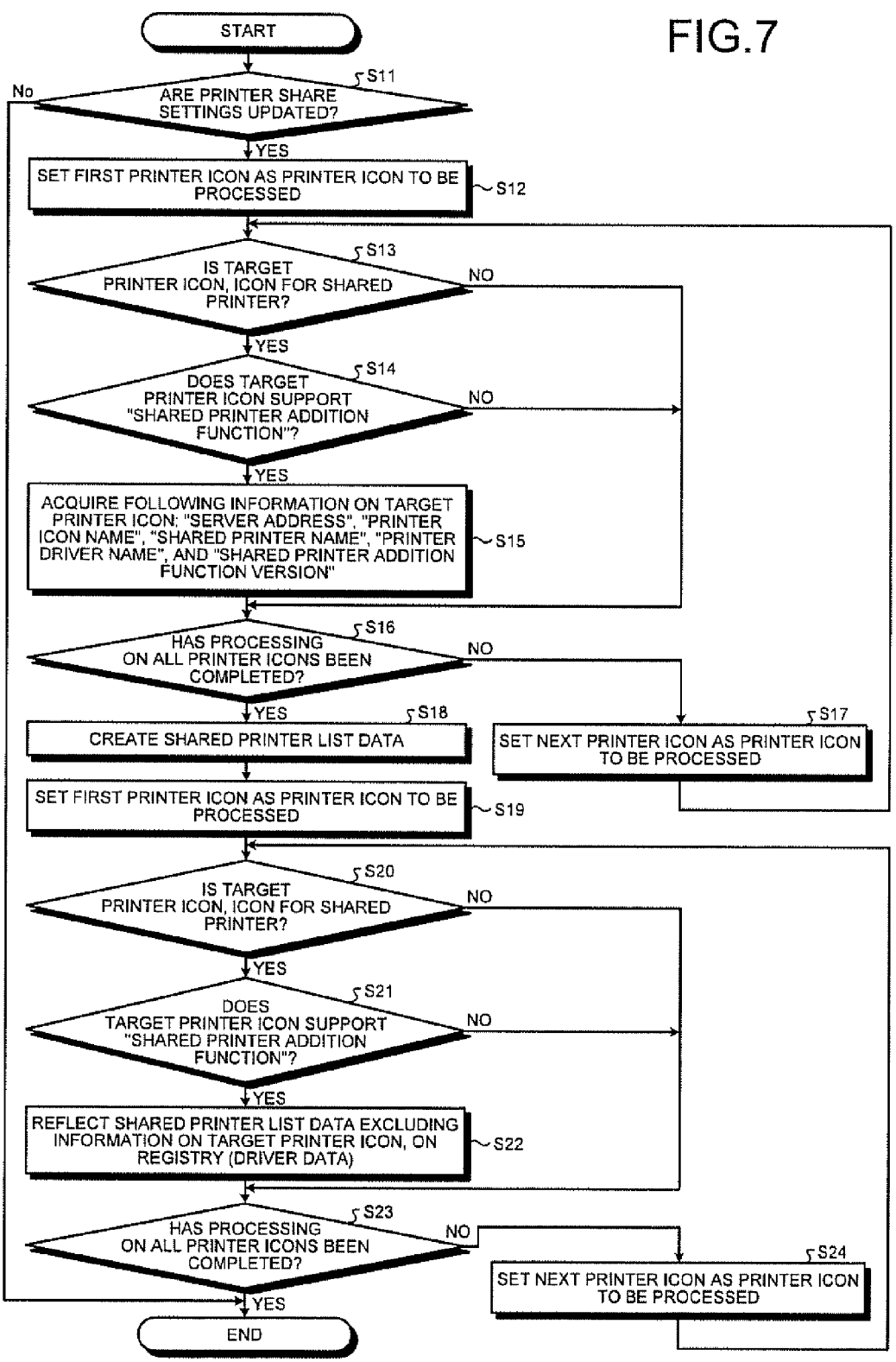
FIG. 7 is a flowchart for explaining an operation of creating and storing shared printer list data in the server according to the first embodiment.

FIG. 7 is a flowchart for explaining an operation of creating and storing shared printer list data in the server according to the first embodiment. An operation of creating and storing shared printer list data in the server 10 will now be described with reference to FIG. 7.

Step S11

When a new printer driver 11 is installed on the server 10, and the printer controlled by the printer driver 11 is set to be shared (share settings are updated) (Yes at step S11), the process proceeds to step S12. If the printer controlled by the printer driver 11 is not set to be shared, the process is finished.

Step S12

The first creation unit 105 of the server 10 identifies the printer icons having been associated with the printer drivers installed on the server 10. The first creation unit 105 then specifies (sets) the target printer icon that is determined to be included in the shared printer list data, among the identified printer icons. The process then proceeds to step S13.

Step S13

The first creation unit 105 determines whether the target printer icon is the icon for the shared printer. In other words, the first creation unit 105 determines whether the printer controlled by the printer driver having been associated with the target printer icon is set to be shared. If the printer is set to be shared (Yes at step S13), the process proceeds to step S14. If the printer is not set to be shared (No at step S13), the process proceeds to step S16.

Step S14

The first creation unit 105 then determines whether the driver data of the target printer icon supports the "shared printer addition function". If the driver data supports the "shared printer addition function" (Yes at step S14), the process proceeds to step S15. If the driver data does not support the "shared printer addition function" (No at step S14), the process proceeds to step S16.

Step S15

The first creation unit 105 obtains the "server address", the "shared printer name", the "printer icon name", the "printer driver name", and the "shared printer addition function version", from the driver data of the target printer icon. The process then proceeds to step S16.

Step S16

The first creation unit 105 determines whether the processing from step S13 to step S15 has been completed for the printer icon associated with the corresponding printer driver installed on the server 10. If the processing has been completed (Yes at step S16), the process proceeds to step S18. If the processing has not been completed (No at step S16), the process proceeds to step S17.

Step S17

The first creation unit 105 specifies (sets) the next target printer icon that is determined to be included in the shared printer list data, among the printer icons identified at step S12. The process then returns to step S13.

Step S18

The first creation unit 105 creates a list of icons that are icons of the shared printers, as well as the corresponding driver data of which supports the "shared printer addition function", among the printer icons identified at step S12. The first creation unit 105 includes the "server address", the "shared printer name", the printer icon name", the "printer driver name", and the "shared printer addition function version" obtained at step S15, among the driver data of the printer icons, in the shared printer list data. The process then proceeds to step S19.

Step S19

The reflection unit 106 of the server 10 identifies the printer icons associated with the printer drivers installed on the server 10. The reflection unit 106 then specifies (sets) the target printer icon that is used to determine whether to include the shared printer list data in the driver data, among the identified printer icons. The process then proceeds to step S20.

Step S20

The reflection unit 106 then determines whether the target printer icon is the icon for the shared printer. In other words, the reflection unit 106 determines whether the printer controlled by the printer driver associated with the target printer icon is set to be shared. If the printer is set to be shared (Yes at step S20), the process proceeds to step S21. If the printer is not set to be shared (No at step S20), the process proceeds to step S23.

Step S21

The reflection unit 106 determines whether the driver data of the target printer icon supports the "shared printer addition function". If the driver data supports the "shared printer addition function" (Yes at step S21), the process proceeds to step S22. If the driver data does not support the "shared printer addition function" (No at step S21), the process proceeds to step S23.

Step S22

The reflection unit 106 reflects (includes) the shared printer list data excluding the information on the target printer icon, from the shared printer list data created at step S18, on the driver data of the target printer icon stored in the registry 12. The process then proceeds to step S23.

Step S23

The reflection unit 106 determines whether the processing from step S20 to step S22 has been completed for the printer icons associated with the printer drivers installed on the server 10. If the processing has been completed (Yes at step S23), the process is finished. If the processing has not been completed (No at step S23), the process proceeds to step S24.

Step S24

The reflection unit 106 specifies (sets) the next target printer icon that is used to determine whether to include the shared printer list data in the driver data, among the identified printer icons. The process then returns to step S20.

By executing the above steps S11 to S24, it is possible to perform the operation of creating and storing the shared printer list data in the server 10 of the installation system 1.

An Operation of Installing a Shared Printer Driver on the Client

Figure 8:
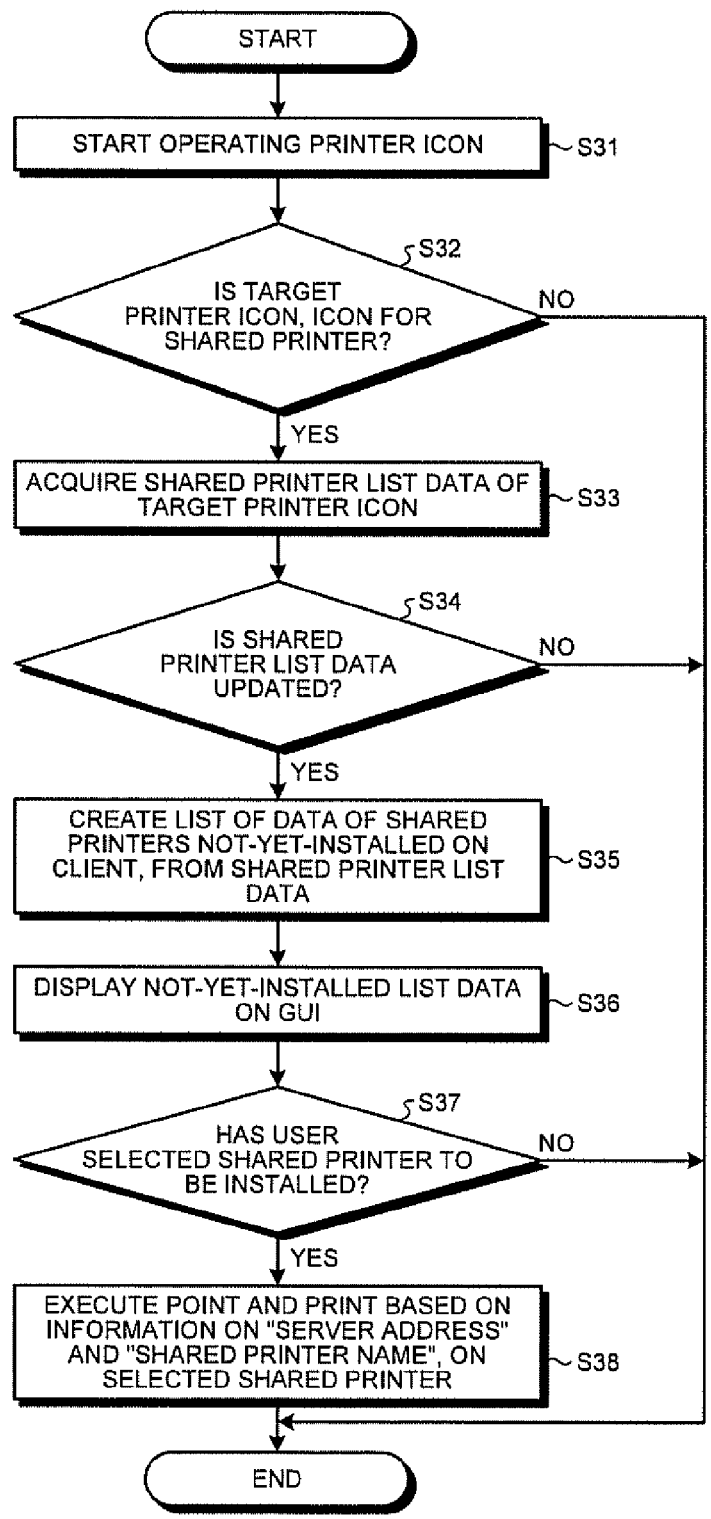
FIG. 8 is a flowchart for explaining an operation of installing a shared printer driver on the client according to the first embodiment.

FIG. 8 is a flowchart for explaining an operation of installing a shared printer driver on the client according to the first embodiment. FIG. 9 is a diagram illustrating an example of a shared printer confirmation screen. The operation of installing a shared printer driver on the client 20 will now be described with reference to FIG. 8 and FIG. 9.

Step S31

The user starts operating the printer icon by opening the print settings screen on the display unit 17 by the print setting unit 102, executing a printing operation in the application 14, or the like. The process then proceeds to step S32.

Step S32

The second creation unit 107 of the client 20 determines whether the printer icon with which the operation has started (hereinafter, referred to as a "target printer icon") is the icon for the shared printer. In other words, the second creation unit 107 determines whether the printer controlled by the printer driver having been associated with the target printer icon is set to be shared. If the printer is set to be shared (Yes at step S32), the process proceeds to step S33. If the printer is not set to be shared (No at step S32), the process is finished.

Step S33

The second creation unit 107 acquires the shared printer list data included in the driver data of the target printer icon (such as the shared printer list data 91a included in the driver data 71a of the printer icon 51a illustrated in FIG. 6). The process then proceeds to step S34.

Step S34

The second creation unit 107 confirms whether the acquired shared printer list data is updated. If the acquired shared printer list data is updated (Yes at step S34), the process proceeds to step S35. If the acquired shared printer list data is not updated (No at step S34), the process is finished.

Step S35

The second creation unit 107 creates not-yet-installed list data that is data including a printer driver list of the not-yet-installed shared printers that are not installed on the client 20, from the acquired shared printer list data. The process then proceeds to step S36.

Step S36

Figure 9:
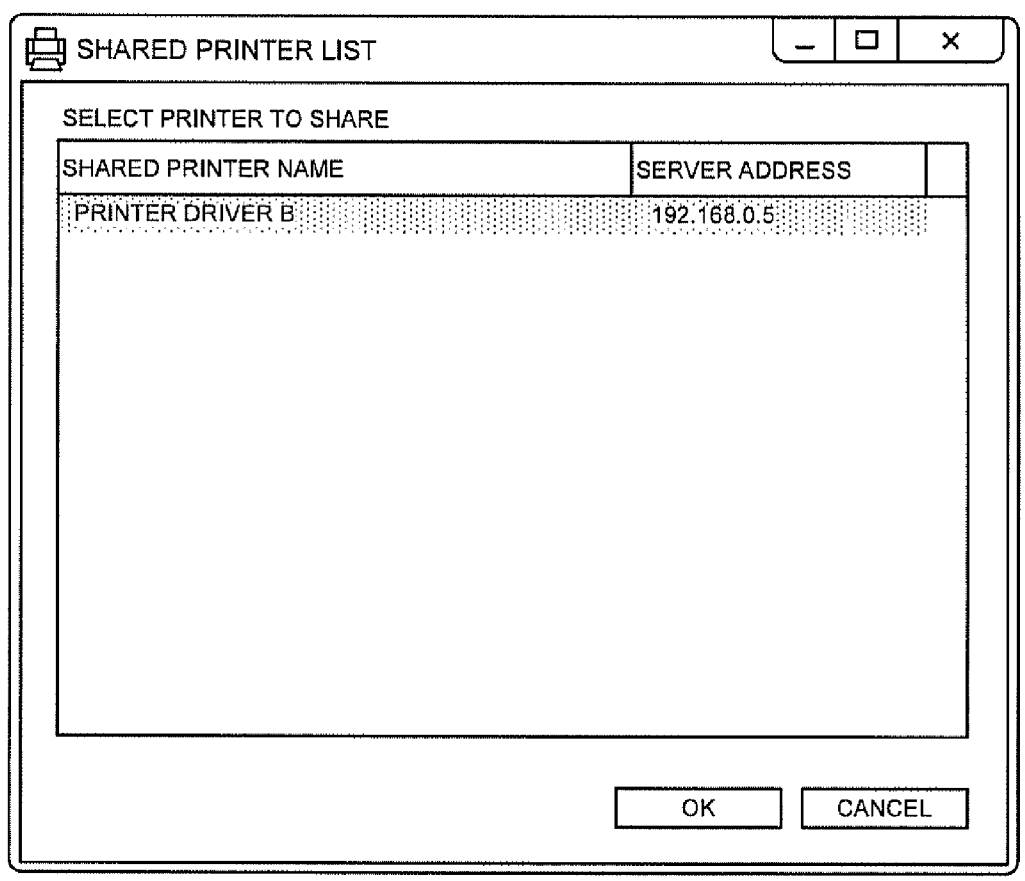
FIG. 9 is a diagram illustrating an example of a shared printer confirmation screen.

The notification unit 108 of the client 20 notifies the display control unit 101 to cause the display unit 17 to display the shared printer confirmation screen illustrated in FIG. 9. The notification unit 108 also notifies the display control unit 101 to cause the display unit 17 to display the printer driver list included in the not-yet-installed list data having been created by the second creation unit 107, on the shared printer confirmation screen. In the example of the shared printer confirmation screen illustrated in FIG. 9, a list of the "shared printer name" and the "server address" among the driver data of the printer driver included in the not-yet-installed list data, is displayed. The process then proceeds to step S37.

Step S37

The notification unit 108 then determines whether the user has selected the printer driver of the shared printer the user wishes to install, from the printer driver list included in the not-yet-installed list data, from the displayed shared printer confirmation screen. If the user has selected the printer driver (Yes at step S37), the process proceeds to step S38. If the user has not selected the printer driver (No at step S37), the process is finished. The printer driver of the shared printer that the user can select from the shared printer confirmation screen is not limited to one, and the user can select a plurality of printer drivers. For example, the operation of selecting the printer driver of the shared printer that the user wishes to install may be performed via the input device 507 (second input unit) illustrated in FIG. 2.

Step S38

The execution unit 109 of the client 20 acquires the printer driver of the shared printer having been selected by the user on the shared printer confirmation screen illustrated in FIG. 9, from the server 10, based on the "server address" and the "shared printer name". The execution unit 109 then installs (Point and Print) the acquired printer driver.

By executing the above steps S31 to S38, it is possible to perform the operation of installing the shared printer driver on the client 20.

As described above, in the installation system 1 according to the present embodiment, on the server 10 side, the first creation unit 105 creates the list of icons of the shared printer as the shared printer list data. Also, on the server 10 side, the reflection unit 106 reflects (includes) the shared printer list data excluding the information on the target printer icon from the shared printer list data, on the driver data of the target printer icon. In the installation system 1, on the client 20 side, the second creation unit 107 acquires the shared printer list data included in the driver data of the printer icon with which the operation has started, and creates the not-yet-installed list data that is data including a printer driver list of the not-yet-installed shared printers that are not installed. Also, on the client 20 side, the notification unit 108 notifies the display control unit 101 to cause the display unit 17 to display the shared printer confirmation screen, and to display the printer driver list included in the not-yet-installed list data on the shared printer confirmation screen. Furthermore, on the client 20 side, the execution unit 109 acquires the printer driver of the shared printer having been selected by the user on the shared printer confirmation screen from the server 10, and installs (Point and Print) the printer driver. In this manner, when a new printer driver is installed on the server 10 and the printer controlled by the printer driver is set to be shared, the client 20 can identify this fact, acquire the new printer driver from the server 10, and install the new printer driver therein.

Second Embodiment

An installation system according to a second embodiment will now be described mainly on differences from the installation system 1 according to the first embodiment. In the first embodiment, the starting point at which the shared printer list data is to be created and stored is when a new printer driver is installed on the server 10, and when the printer controlled by the printer driver is set to be shared (the share settings are updated). The present embodiment describes an operation that is performed when the starting point is when the printer driver of a new printer is installed on the server 10. The structure of the installation system according to the present embodiment is the same as that of the installation system 1 illustrated in FIG. 1, and the hardware structure of a server 10a and a client 20a included in the installation system is the same as that of the hardware structure illustrated in FIG. 2.

Functional Block Structure of the Server and the Client

Figure 10:
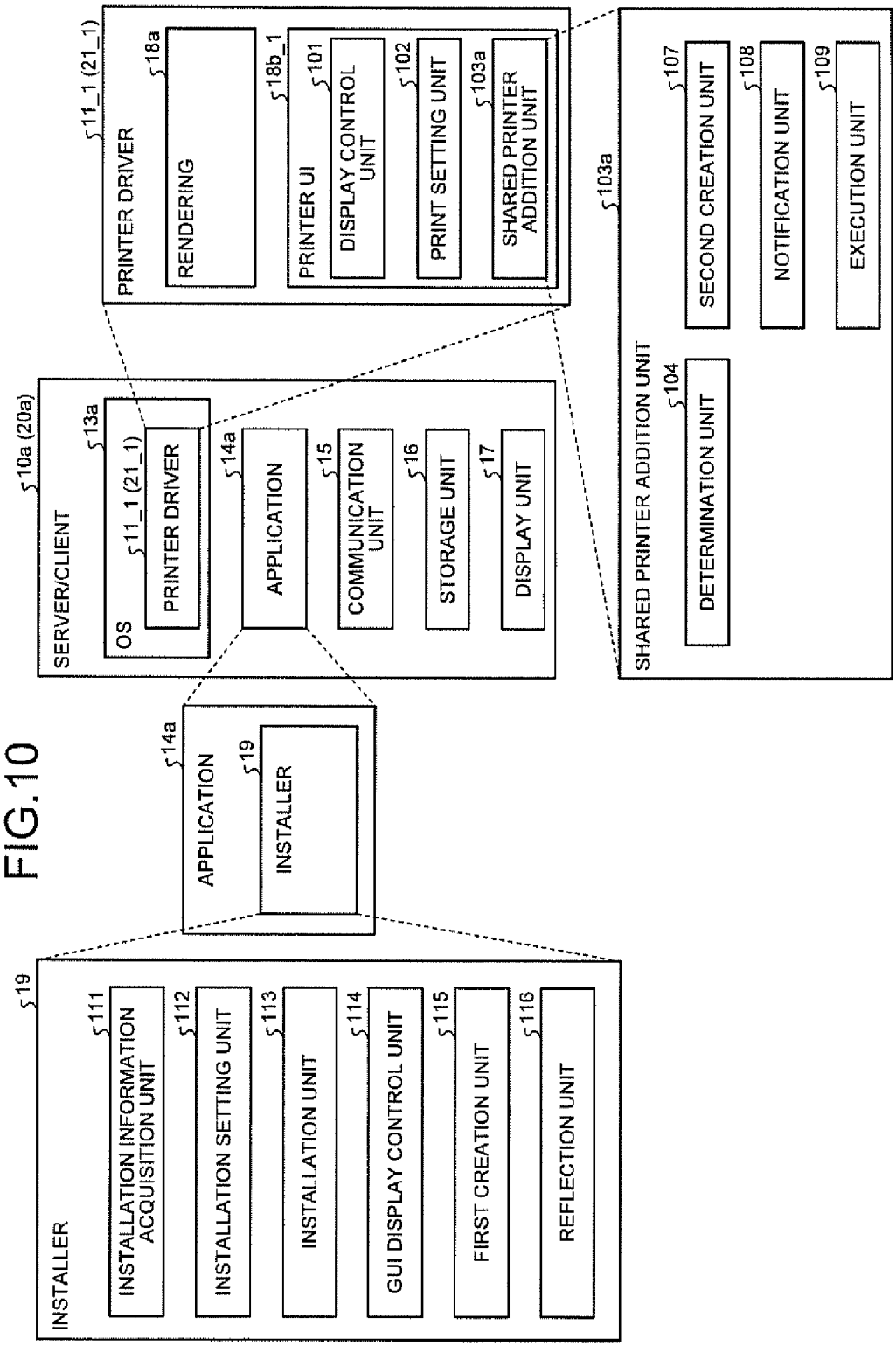
FIG. 10 is a diagram illustrating an example of a functional block structure of a server and a client according to a second embodiment.

FIG. 10 is a diagram illustrating an example of a functional block structure of a server and a client according to the second embodiment. The structure and the operation of the functional blocks of the server 10a and the client 20a in the installation system according to the present embodiment will now be described with reference to FIG. 10.

As illustrated in FIG. 10, the server 10a and the client 20a are each installed with an OS 13a and an application 14a. Also, the server 10a and the client 20a each include the communication unit 15, the storage unit 16, and the display unit 17.

For example, the OS 13a is basic software such as Windows, and controls the execution of computer programs such as the application 14. The OS 13a includes a printer driver 11_1 (printer driver 21_1). The printer driver 11_1 is installed on the server 10a, and the printer driver 21_1 is installed on the client 20a. The printer driver 11_1 (printer driver 21_1) is software that controls the operation of the printer 30 connected to the network 40. If the printer 30 supports a plurality of PDLs, a plurality of printer drivers 11_1 (printer drivers 21_1) may be installed. The printer driver 11_1 (printer driver 21_1) may control a plurality of printers 30. The printer driver 11_1 (printer driver 21_1) includes the rendering 18a and a printer UI 18b_1.

The rendering 18a converts the print data delivered from applications (not limited to the application 14a) of the server 10a (server 20a) to a specific PDL. The display control unit 101, the print setting unit 102, and a shared printer addition unit 103a are implemented, when the printer UI 18b_1 is executed by the CPU 501 illustrated in FIG. 2.

The application 14a is a computer program that generates print data, and instructs the printer 30 to execute printing. The application 14a of the server 10a includes an installer 19.

The installer 19 is a computer program that installs a printer driver for controlling the operation of the printer 30 on the server 10, so as to cause the printer 30 to execute printing using the application 14a. An installation information acquisition unit 111, an installation setting unit 112, an installation unit 113 (second execution unit), a GUI display control unit 114, a first creation unit 115, and a reflection unit 116 are implemented when the installer 19 is executed by the CPU 501 illustrated in FIG. 2.

The communication unit 15 is a functional unit used to communicate data between the client 20a (server 10a) and the printer 30. The communication unit 15 is implemented using the network I/F 508 illustrated in FIG. 2.

The storage unit 16 is a functional unit that stores therein various types of data such as the OS 13a, which is software, the application 14a, and print data. The storage unit 16 is implemented using the auxiliary storage device 504 illustrated in FIG. 2.

The display unit 17 is a function that displays a GUI and the like when the OS 13a, the application 14a, or the like is executed. The display unit 17 is implemented using the display device 506 illustrated in FIG. 2.

The display control unit 101 is a functional unit that causes the display unit 17 to display information required to operate the printer driver 11_1 (printer driver 21_1), a screen for setting printing, or the like.

The print setting unit 102 is a functional unit that sets new print settings or makes changes in the print settings, via the screen for setting printing having been displayed on the display unit 17 by the display control unit 101.

The shared printer addition unit 103a is a functional unit that installs (Point and Print) a not-yet-installed printer driver on the client 20a side, among the shared printer list data created on the server 10a side. The shared printer addition unit 103a includes the determination unit 104, the second creation unit 107, the notification unit 108, and the execution unit 109.

The determination unit 104 is a functional unit that determines the operating environment of the currently running printer driver, from the environments of the stand-alone environment, and the server environment and the client environment in the Point and Print environment.

The second creation unit 107 is a functional unit that acquires shared printer list data from the driver data of the printer icon having been specifically set to be shared, when the determination unit 104 determines that the operating environment is the client environment (printer driver including the determination unit 104 is included in the client 20a). The second creation unit 107 then creates not-yet-installed list data that is data including a printer driver list of not-yet-installed shared printers not having been installed on the client 20, from the shared printer list data.

The notification unit 108 is a functional unit that, when the determination unit 104 determines that the operating environment is the client environment, notifies the display control unit 101 to cause the display unit 17 to display the shared printer confirmation screen illustrated in FIG. 9 described above and to display the printer driver list included in the not-yet-installed list data having been created by the second creation unit 107, on the shared printer confirmation screen. The user selects a printer driver the user wishes to install, from the printer driver list included in the not-yet-installed list data, which is notified by the notification unit 108.

The execution unit 109 is a functional unit that acquires the printer driver having been selected by the user on the shared printer confirmation screen, from the server 10 via the network 40, when the determination unit 104 determines that the operating environment is the client environment. The execution unit 109 then installs (Point and Print) the acquired printer driver.

The installation information acquisition unit 111 is a functional unit that acquires information on the printer driver installed on the server 10a. Examples of the information on the printer driver include a list of printer ports of that can be allocated when a new printer driver is to be installed or a list of printer icon names associated with the installed printer drivers.

The installation setting unit 112 is a functional unit that performs setting for installation (installation settings), based on the user operation, via the installation screen illustrated in FIG. 12, which will be described below, having been displayed on the display unit 17 by the GUI display control unit 114. For example, the contents of the installation settings are the printer name, the printer port name, the presence of printer share settings, and the shared printer name.

The installation unit 113 is a functional unit that installs a new printer driver, based on the installation settings set by the installation setting unit 112.

The GUI display control unit 114 is a functional unit that causes the display unit 17 to display information required for installing the printer driver on the server 10a, an installation settings screen (such as an installation screen illustrated in FIG. 12), and the like.

The first creation unit 115 is a functional unit that creates shared printer list data. The shared printer list data is the same as that described in the first embodiment.

The reflection unit 116 is a functional unit that reflects information including the "server address", the "shared printer name", the "printer icon name", the "printer driver name", and the "shared printer addition function version" as the driver data of the printer driver to be installed anew, on the driver data of another printer icon.

The display control unit 101, the print setting unit 102, the shared printer addition unit 103a, the determination unit 104, the second creation unit 107, the notification unit 108, the execution unit 109, the installation information acquisition unit ill, the installation setting unit 112, the installation unit 113, the GUI display control unit 114, the first creation unit 115, and the reflection unit 116 are conceptual functions, and the structure is not limited thereto. For example, a plurality of functional units that are illustrated as separate functional units in FIG. 10 may be configured as a single functional unit. A plurality of functions included in a single functional unit in FIG. 10 may be divided into a plurality of pieces, and may be configured as a plurality of functional units.

An Operation of Creating and Storing Shared Printer List Data in the Server

Figure 11:
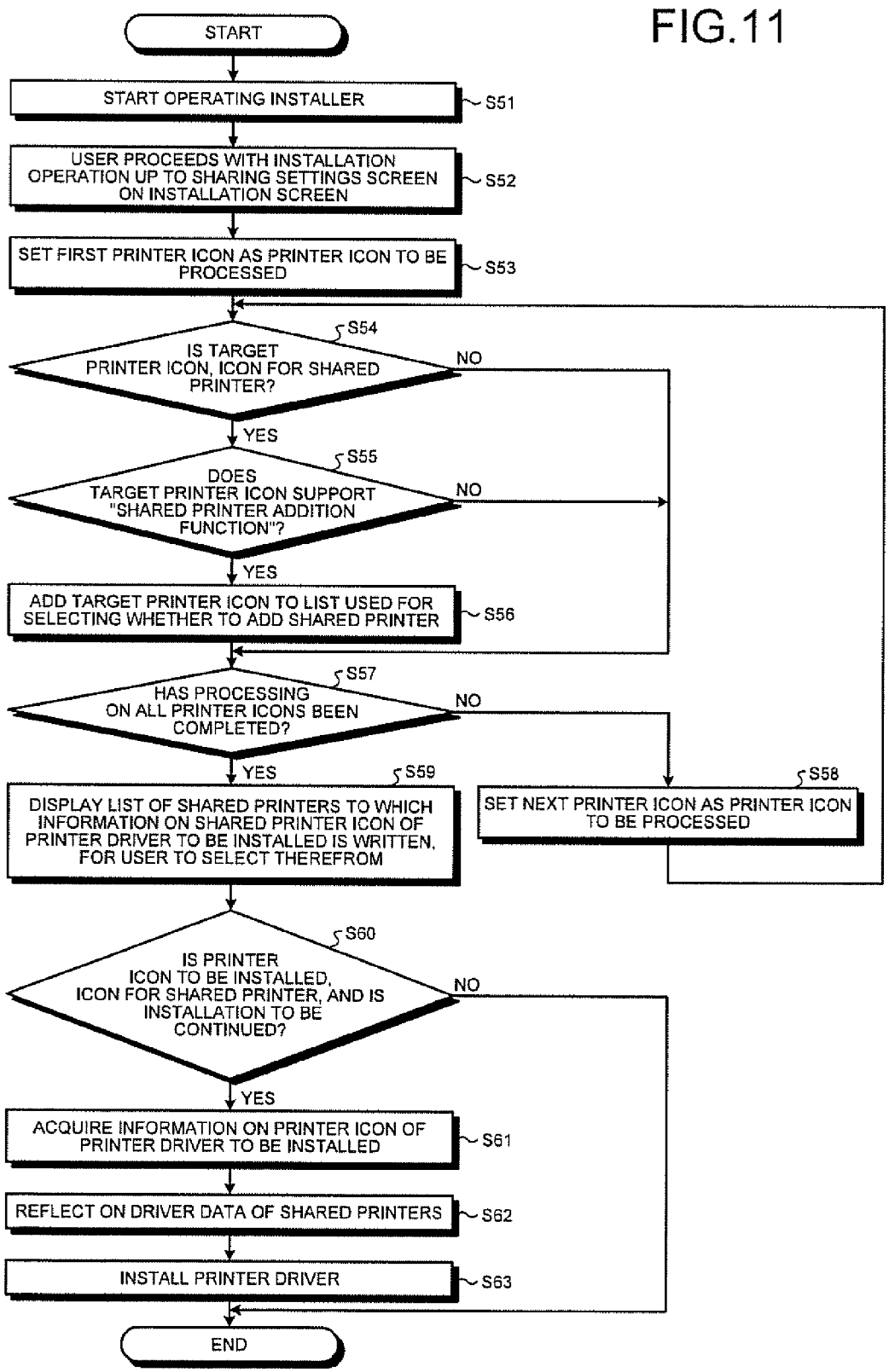
FIG. 11 is a flowchart for explaining an operation of creating and storing shared printer list data in the server according to the second embodiment.

FIG. 11 is a flowchart for explaining an operation of creating and storing shared printer list data in the server according to the second embodiment. FIG. 12 is a diagram illustrating an example of an installation screen that displays a list of shared printers. The operation of creating and storing shared printer list data in the server 10a as well as well as the operation of installing the shared printer list data will now be described with reference to FIG. 11 and FIG. 12.

Step S51

The user performs an installation operation of a new printer by the function of the installer 19 of the application 14a, and starts operating the installer 19. The installation information acquisition unit 111 acquires information on the printer driver that is installed on the server 10a. The process then proceeds to step S52.

Step S52

The user proceeds with the installation operation up to the sharing settings screen (installation screen illustrated in FIG. 12) of the printer driver, according to the screen displayed on the display unit 17 by the GUI display control unit 114. The installation setting unit 112 then performs setting for installation (installation settings), based on the user operation, via the installation screen. The process then proceeds to step S53.

Step S53

The first creation unit 115 of the server 10a identifies the printer icons associated with the printer drivers that are installed on the server 10a, from the information on the printer driver acquired by the installation information acquisition unit 111. The first creation unit 115 then specifies (sets) the target printer icon that is used to determine whether to include the information on the printer driver to be installed anew, among the identified printer icons, in the shared printer list data of the driver data of the printer drivers having been already installed. The process then proceeds to step S54.

Step S54

The first creation unit 115 determines whether the target printer icon is the icon for the shared printer. In other words, the first creation unit 115 determines whether the printer controlled by the printer driver having been associated with the target printer icon is set to be shared. If the printer is set to be shared (Yes at step S54), the process proceeds to step S55. If the printer is not set to be shared (No at step S54), the process proceeds to step 357.

Step S55

The first creation unit 115 determines whether the driver data of the target printer icon supports the "shared printer addition function". If the driver data of the target printer icon supports the "shared printer addition function" (Yes at step S55), the process proceeds to step S56. If the driver data of the target printer icon does not support the "shared printer addition function" (No at step S55), the process proceeds to step S57.

Step S56

Figure 12:
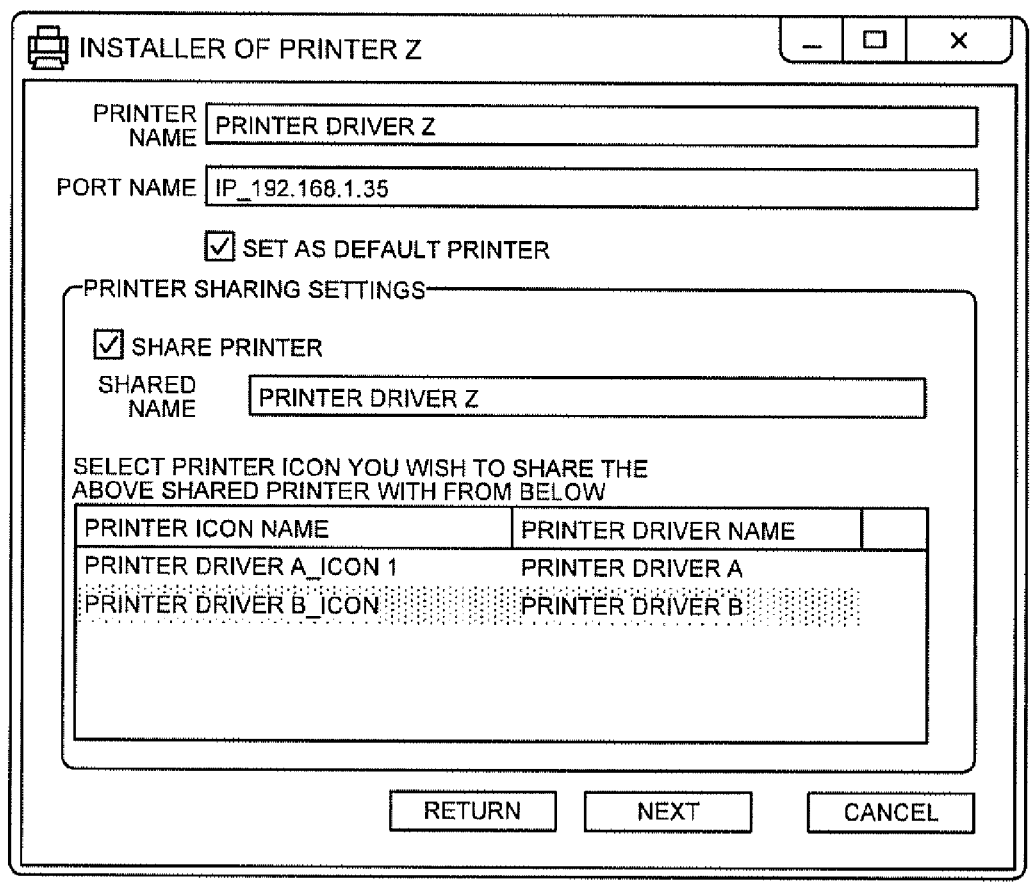
FIG. 12 is a diagram illustrating an example of an installation screen that displays a list of shared printers.

The first creation unit 115 (extraction unit) adds the target printer icon to the list that is used for selecting whether to include the information on the printer driver to be installed anew, in the shared printer list data of the driver data of the printer icons of the shared printers, on the installation screen illustrated in FIG. 12. The process then proceeds to step S57.

Step S57

The first creation unit 115 then determines whether the processing from step S54 to step S56 has been completed for the printer icon that is associated with the corresponding printer driver installed on the server 10a. If the processing has been completed (Yes at step S57), the process proceeds to step S59. If the processing has not yet completed (No at step S57), the process proceeds to step S58.

Step S58

The first creation unit 115 specifies (sets) the next target printer icon that is used to determine whether to include the information on the printer driver to be installed anew, among the printer icons identified at step S53, in the shared printer list data of the driver data of the printer drivers having been already installed. The process then returns to step S54.

Step S59

The user selects a desired printer icon among the printer icons that are added to the list on the installation screen, as candidates to which the information on the printer driver to be installed anew is written by the first creation unit 115. The user may also select a plurality of printer icons from the printer icons added to the list. The operation of selecting a desired printer icon from the printer icons that are added to the list on the installation screen may be performed via the input device 507 (first input unit) illustrated in FIG. 2, for example. The process then proceeds to step S60.

Step S60

If the user has set the printer driver to be installed anew to be shared, on the installation screen illustrated in FIG. 12, in other words, if the printer icon is already set as the shared printer, and if the installation process is to be continued (Yes at step S60), the process proceeds to step S61. If the installation process is not to be continued (No at step S60), the process is finished.

Step S61

The first creation unit 115 acquires the "server address", the "shared printer name", the "printer icon name", the "printer driver name", and the "shared printer addition function version" as the driver data of the printer driver to be installed anew, from the installation settings set on the installation screen illustrated in FIG. 12, for example. The first creation unit 115 also acquires the "server address", the "shared printer name", the "printer icon name", the "printer driver name", and the "shared printer addition function version" from the driver data of the printer icon for the shared printer that is added to the list on the installation screen illustrated in FIG. 12. The first creation unit 115 then creates a list including the printer icon of the printer driver to be installed anew and the printer icon for the shared printer that is added to the list on the installation screen, as the shared printer list data. The process then proceeds to step S62.

Step S62

The reflection unit 116 of the server 10a reflects (includes) the "server address", the "shared printer name", the "printer icon name", the "printer driver name", and the "shared printer addition function version" as the driver data of the printer driver that is to be installed anew, acquired by the first creation unit 115, on the shared printer list data of the driver data of the printer icon having been selected by the user, from the printer icon list on the installation screen illustrated in FIG. 12. The reflection unit 116 then reflects (includes) the shared printer list data excluding the information on the printer icon of the printer driver that is to be installed anew, from the shared printer list data created by the first creation unit 115 at step S61, on the driver data of the printer icon that is to be installed anew and that is stored in the registry 12. The process then proceeds to step S63.

The reflection unit 116 reflects the shared printer list data from which the information on the printer icon of the printer driver that is to be installed anew is only excluded, from the shared printer list data created by the first creation unit 115, on the driver data of the printer icon that is to be installed anew. However, it is not limited thereto. For example, the reflection unit 116 may reflect the shared printer list data of the driver data of the printer icon having been selected by the user from the printer icons that are added to the list on the installation screen in FIG. 12, among the shared printer list data created by the first creation unit 115, on the driver data of the printer icon that is to be installed anew.

Step S63

The installation unit 113 of the server 10a installs a new printer driver based on the installation settings set by the installation setting unit 112.

By executing the above steps S51 to S63, it is possible to perform the operation of creating and storing the shared printer list data in the server 10a of the installation system according to the present embodiment, as well as the operation of installing the shared printer list data. The installation operation of the shared printer driver on the client 20a in the installation system according to the present embodiment is the same as the installation operation of the shared printer driver on the client 20 in the first embodiment.

In the first embodiment, the printer driver includes the first creation unit 105 and the reflection unit 106. In the present embodiment, the installer includes the first creation unit 115 and the reflection unit 116. Thus, when a new printer driver is to be installed on the server 10a, the information on the printer driver is included in the driver data of the printer icon for the shared printer having been selected by the user. Consequently, when the printer driver, which is set to be shared, is activated on the client 20a side, a not-yet-installed printer driver the user wishes to install may be selected in advance using the Point and Print in association with the printer driver. Also, as in the first embodiment, when a new printer driver is installed on the server 10a and the printer controlled by the printer driver is set to be shared, the client 20a can identify this fact, acquire the new printer driver from the server 10a, and install the new printer driver therein.

When at least one of the functional units of the display control unit 101, the print setting unit 102, and the shared printer addition unit 103 of the printer driver 11 (printer driver 21) in the server 10 (client 20) according to the first embodiment described above are to be implemented by executing a computer program, the computer program may be provided by being incorporated into the ROM 502 and the like illustrated in FIG. 2 in advance. When at least one of the functional units of the display control unit 101, the print setting unit 102, and the shared printer addition unit 103a of the printer driver 11_1 (printer driver 21_1) in the server 10a (client 20a), as well as the installer 19 in the server 10a according to the second embodiment described above are to be implemented by executing a computer program, the computer program may be provided by being incorporated into the ROM 502 and the like illustrated in FIG. 2 in advance.

The computer program executed by the installation system of the embodiments described above may be provided by being recorded in a computer-readable recording medium such as a CD-ROM, a flexible disk (FD), a compact disc-recordable (CD-R), and a digital versatile disc (DVD) in an installable or executable file format. The computer program executed by the installation system of the embodiments described above may be stored in a computer connected to a network such as the Internet, or provided by being downloaded through the network. The computer program executed by the installation system of the embodiments described above may also be provided or distributed via the network such as the Internet. The computer program executed by the installation system of the embodiments described above has a module structure including at least one of the functional units described above. As actual hardware, the CPU 501 reads out the computer program from the ROM 502 described above, and executes the computer program, thereby loading the above units into a main storage device and generating the units on the main storage device.

According to the present embodiments, when a new printer is shared on a server, a client can identify the new printer and install a printer driver of the new printer.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An installation system, comprising:
   a first storage unit configured to store therein driver information on printer drivers having been installed on an information processing apparatus;
   a second storage unit configured to store therein driver information on printer drivers having been installed on a server;
   a creation unit configured to create shared information indicating a printer driver of a shared printer from the printer drivers having been installed on the server;
   a reflection unit configured to reflect the shared information created by the creation unit, on the driver information on each of the printer drivers having been stored in the second storage unit;
   an acquisition unit configured to acquire the shared information indicating the printer driver of the shared printer, having been reflected from the server, from the driver information;
   a specification unit configured to specify a printer driver not having been installed on the information processing apparatus, from the shared information acquired by the acquisition unit; and
   a first execution unit configured to install at least one of the printer drivers specified by the specification unit by acquiring the printer driver from the server,
   wherein the reflection unit reflects shared information excluding information indicating the printer driver that supports specific driver information having been stored in the second storage unit, from the shared printer information created by the creation unit, on the specific driver information.

2. The installation system according to claim 1, further comprising:
   an extraction unit configured to extract the printer driver of the shared printer, from the printer drivers having been installed on the server;
   a second execution unit configured to install a new printer driver of the shared printer, on the server; and
   a first input unit configured to receive a selection operation of a printer driver that is performed to determine whether to include information on the printer driver to be installed by the second execution unit, in the shared information of the driver information on the printer driver, from the printer driver having been extracted by the extraction unity,
   wherein the reflection unit is configured to reflect the information on the printer driver to be installed by the second execution unit, on the shared information of the driver information on the printer driver having been selected by the first input unit.

3. The installation system according to claim 1, wherein the reflection unit synchronizes the shared information having been reflected with the shared information included in the driver information on the printer driver corresponding to the printer driver that has reflected the shared information, from the printer drivers having been installed on the information processing apparatus.

4. The installation system according to claim 1, wherein the acquisition unit acquires the shared information from the driver information on the printer driver that has started operating in the information processing apparatus.

5. The installation system according to claim 1, further comprising:
   a notification unit configured to notify a list of the printer drivers specified by the specification unit, and
   a second input unit configured to receive a selection operation of a specific printer driver from the list having been notified, wherein
   the first execution unit configured to install the printer driver having been selected by the second input unit by acquiring the printer driver from the server.

6. The installation system according to claim 1, further comprising a shared printer configured to be controlled by the printer driver to be installed by the first execution unit.

7. An information processing apparatus comprising a processor and one or more programs of executable instructions embodied in a non-transitory medium and executable by the processor to configure the information processing apparatus to perform a process comprising the steps of:
- (a) storing, in a storage device, (i) driver information on printer drivers having been installed on the information processing apparatus and (ii) driver information on printer drivers having been installed on a server;
- (b) creating shared information indicating a printer driver of a shared printer from the printer drivers having been installed on the server;
- (c) reflecting the shared information, created in (b), on the driver information on each of the printer drivers having been stored in the storage device;
- (d) acquiring the shared information indicating the printer driver of the shared printer, having been reflected from the server, from the driver information;
- (e) specifying a printer driver not having been installed, from the shared information acquired in (d);
- (f) installing at least one of the printer drivers specified in (e) by acquiring the printer driver from the server; and
- (g) reflecting shared information, excluding information indicating the printer driver that supports specific driver information having been stored in the storage device, from the shared information created in (b), on the specific driver information.

8. An installation method performed by a computer executing one or more programs of executable instructions embodied in a non-transitory medium, the installation method comprising:
- (a) storing, in a storage device, (i) driver information on printer drivers having been installed on an information processing apparatus and (ii) driver information on printer drivers having been installed on a server;
- (b) creating shared information indicating a printer driver of a shared printer from the printer drivers having been installed on the server;
- (c) reflecting the shared information, created in (b), on the driver information on each of the printer drivers having been stored in the storage device;
- (d) acquiring the shared information indicating the printer driver of the shared printer, having been reflected from a server, from the driver information stored in the storage device;
- (e) specifying a printer driver not having been installed on the information processing apparatus, from the shared information acquired in (d); and
- (f) installing the printer drivers having been specified by acquiring the printer driver from the server; and
- (g) reflecting shared information, excluding information indicating the printer driver that supports specific driver information having been stored in the storage device, from the shared information created in (b), on the specific driver information.

* * * * *